(12) United States Patent
Taki

(10) Patent No.: US 12,026,497 B2
(45) Date of Patent: Jul. 2, 2024

(54) CONTROL SYSTEM, MOVING BODY, CONTROL METHOD, AND COMPUTER-READABLE STORAGE MEDIUM FOR CONTROLLING AN UPDATE OF THE UPDATE PROGRAM

(71) Applicant: HONDA MOTOR CO., LTD., Tokyo (JP)

(72) Inventor: Tomoaki Taki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 83 days.

(21) Appl. No.: 17/560,307

(22) Filed: Dec. 23, 2021

(65) Prior Publication Data

US 2022/0222058 A1    Jul. 14, 2022

(30) Foreign Application Priority Data

Jan. 14, 2021  (JP) .................................. 2021-004568

(51) Int. Cl.
*G06F 8/65* (2018.01)
*H04W 4/40* (2018.01)

(52) U.S. Cl.
CPC ................. *G06F 8/65* (2013.01); *H04W 4/40* (2018.02)

(58) Field of Classification Search
CPC .. G06F 8/65; H04W 4/40; H04W 4/44; H04L 67/34; B60R 16/0232
See application file for complete search history.

(56) References Cited

U.S. PATENT DOCUMENTS

| | | | | |
|---|---|---|---|---|
| 10,082,247 B1* | 9/2018 | Sinding | ................. | F17C 13/025 |
| 2009/0300595 A1* | 12/2009 | Moran | ....................... | G06F 8/65 |
| | | | | 717/173 |
| 2015/0113521 A1* | 4/2015 | Suzuki | ...................... | G06F 8/65 |
| | | | | 717/173 |
| 2019/0193713 A1* | 6/2019 | Son | ..................... | F02N 11/0803 |
| 2019/0354364 A1* | 11/2019 | Seki | .......................... | G06F 8/65 |
| 2021/0012585 A1* | 1/2021 | Huang | ................... | G07C 5/008 |
| 2021/0109524 A1* | 4/2021 | Goldman | ............. | G05D 1/0088 |
| 2021/0191661 A1 | 6/2021 | Harata | | |

FOREIGN PATENT DOCUMENTS

| | | | | | |
|---|---|---|---|---|---|
| CN | 112073935 A | * | 12/2020 | ............... | G08G 1/22 |
| JP | 6628375 B1 | * | 1/2020 | | |
| JP | 2020027666 A | | 2/2020 | | |
| WO | WO-2018142749 A1 | * | 8/2018 | ............. | B60R 16/02 |
| WO | WO-2019087820 A1 | * | 5/2019 | ............... | G06F 8/65 |

* cited by examiner

*Primary Examiner* — Daxin Wu

(57) ABSTRACT

A control system includes a moving body control unit configured to control a moving body, an update control unit configured to control reception of an update program of the moving body control unit from an external device and control update of the moving body control unit by the update program, and a determination unit configured to determine whether the moving body is refueled during a time until a predetermined time elapses before the update of the moving body control unit by the update program is started. When the determination unit determines that the moving body is refueled, the update control unit stops starting of the update of the moving body control unit by the update program.

16 Claims, 7 Drawing Sheets

CONTROL SYSTEM, MOVING BODY, CONTROL METHOD, AND COMPUTER-READABLE STORAGE MEDIUM FOR CONTROLLING AN UPDATE OF THE UPDATE PROGRAM

The contents of the following Japanese patent application(s) are incorporated herein by reference: NO. 2021-004568 filed on Jan. 14, 2021.

BACKGROUND

1. Technical Field

The present invention relates to a control system, a moving body, a control method, and a computer-readable storage medium.

2. Related Art

Patent document 1 discloses an ECU that can rewrite an application program as an ECU for a vehicle.

PRIOR ART DOCUMENTS

Patent Documents

Patent document 1: Japanese Patent Application Publication No. 2020-27666

DESCRIPTION OF EXEMPLARY EMBODIMENTS

Hereinafter, the present invention will be described through embodiments of the invention, but the following embodiments do not limit the inventions that fall within the scope of the claims. In addition, not all combinations of features described in the embodiments are essential to the means of solving the invention.

Figure 1:
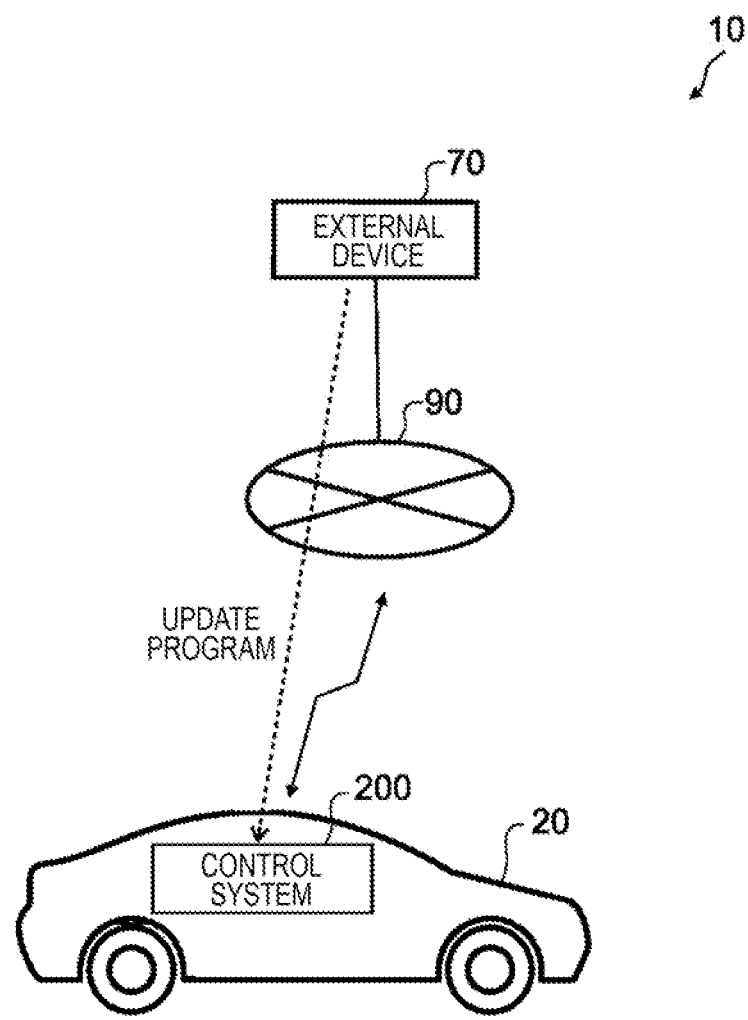
FIG. 1 schematically shows an update system 10 according to an embodiment.

FIG. 1 schematically shows an update system 10 according to an embodiment. The update system 10 includes a vehicle 20 and an external device 70. The vehicle 20 includes a control system 200. The control system 200 is responsible for controlling the vehicle 20 and communicating with the external device 70 through a communication network 90. The communication network 90 includes an IP network such as the Internet and the like, a P2P network, a dedicated line including a VPN, a virtual network, a moving body communication network, and the like.

In the vehicle 20, the control system 200 includes a plurality of ECUs (Electronic Control Units) that control the vehicle 20. The control system 200 obtains an update program of the ECU included in the control system 200 from the outside. For example, the control system 200 receives the update program sent from the external device 70 by wireless communication through the communication network 90. The control system 200 reprograms the ECU included in the control system 200 by the update program. Reprogramming is performed for the purpose of upgrading and the like of a function of the ECU included in the control system 200. In this way, the control system 200 updates the ECU by reprogramming the ECU by OTA (Over The Air).

When the ECU can be updated by the update program, the control system 200 notifies a user of the vehicle 20 that the update will be executed when an IG (ignition) switch of the vehicle 20 is turned off. The control system 200 starts the update of the ECU when an update postponement instruction is not obtained from the user before a predetermined time elapses. At this time, the control system 200 automatically starts the update on condition that a fuel storage amount in a fuel tank has not increased since the IG switch was turned off. When the update of the ECU ends, the control system 200 turns off a power state of the vehicle 20.

When the update of the ECU starts, it is prohibited to turn on the IG power supply until the update of the ECU ends. For this reason, when the update of the ECU is started, downtime of the vehicle 20 occurs until the update of the ECU is completed. For this reason, for example, if the update of the ECU is executed when the vehicle 20 is stopped at a fuel stand, the vehicle 20 cannot be driven unless the update of the ECU is completed by the time refueling is completed. On the other hand, according to control by the control system 200, it is possible to reduce the possibility that the update of the ECU is started after the vehicle 20 has stopped at a fuel stand. In addition, since the ECU is automatically updated when there is no update postponement instruction from the user and fuel is not being supplied to the vehicle 20, it is possible to prevent the ECU from being left without being updated when an important update program exists.

In addition, according to the control by the control system 200, since the update postponement instruction can be received from the user until the predetermined time elapses after the IG switch is turned off, it is possible to prevent the update of the ECU from starting when the user wants to immediately use the vehicle 20 after the IG switch is turned off. As a result, it is possible to prevent the occurrence of downtime that is unintended by the user. In addition, since the update postponement instruction can be accepted for the predetermined time after the IG switch is turned off and the power state is turned off when the update is completed, it is possible to prevent power of a battery included in the vehicle 20 from being wasted.

Figure 2:
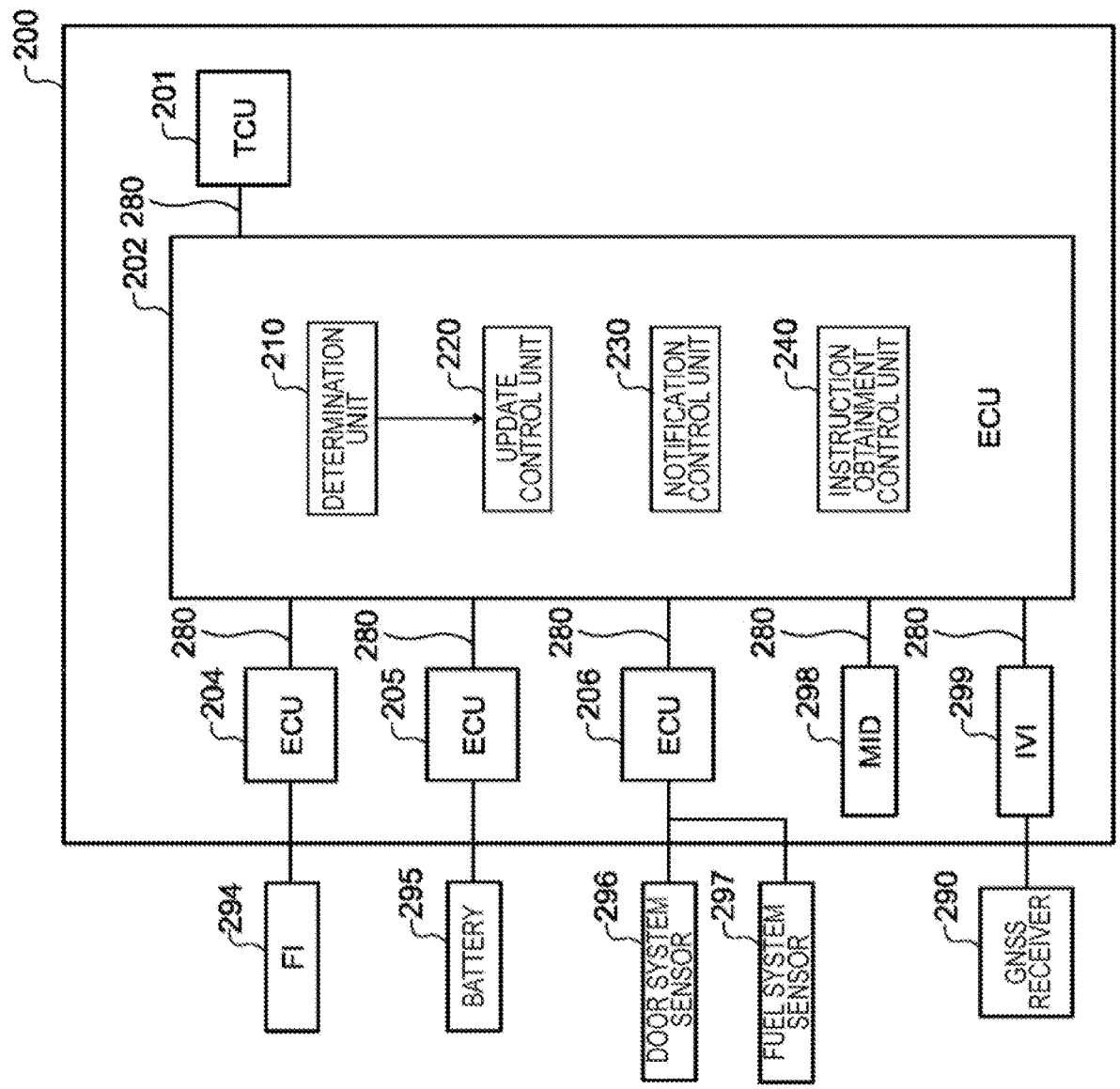
FIG. 2 schematically shows a system configuration included in a control system 200.

FIG. 2 schematically shows a system configuration included in the control system 200. The control system 200 includes a TCU 201, an ECU 202, an ECU 204, an ECU 205, an ECU 206, an MID 298, and an IVI 299. In FIG. 2, an FI 294, a battery 295, a door system sensor 296, a fuel system sensor 297, and a GNSS receiver 290 are devices included in the vehicle 20.

The ECU 202 is connected to the TCU 201, the ECU 204, the ECU 205 and the ECU 206 through an in-vehicle communication line 280. The ECU 202 communicates with the TCU 201, the ECU 204, the ECU 205, the ECU 206, the MID 298, and the WI 299 through the in-vehicle communication line 280. The ECU 202 controls the TCU 201, the ECU 204, the ECU 205, the ECU 206, the MID 298, and the IVI 299 in an integrated manner. The in-vehicle communication line 280 may be configured to include, for example, a CAN (Controller Area Network), an ether network, and the like.

The TCU 201 is a Telematics Control Unit. The TCU 201 is mainly responsible for moving body communication. The TCU 201 sends and receives data to and from the external device 70 based on control by the ECU 202. The TCU 201 receives the update program from the external device 70 by moving body communication based on the control by the ECU 202. The TCU 201 is an example of a communication unit.

The MID 298 is a multi-information display. The IVI 299 is, for example, an in-vehicle infotainment information device (IVI). The MID 298 and the IVI 299 are connected to the ECU 202 via the in-vehicle communication line 280. The MID 298 and the WI 299 may function as display control units. The IVI 299 includes a wireless LAN communication function. The IVI 299 receives the update program from the external device 70 by wireless LAN communication based on the control by the ECU 202. The IVI 299 obtains location information from the GNSS receiver 290. The IVI 299 outputs the location information obtained from the GNSS receiver 290 to the ECU 202.

The ECU 204, the ECU 205, and the ECU 206 are ECUs as vehicle control units that each control the vehicle 20. The ECU 204, the ECU 205, and the ECU 206 are examples of a "moving body control unit". The ECU 204, the ECU 205, and the ECU 206 control various devices included in the vehicle 20. For example, the ECU 204 controls the FI 294 which is a fuel injection device. The ECU 205 controls the battery 295 which is a high-voltage battery. The ECU 206 controls the door system sensor 296 and the fuel system sensor 297. The door system sensor 296 includes a fuel lid sensor that detects an open/closed state of a fuel supply port. The fuel system sensor 297 includes a fuel level sensor for detecting the fuel storage amount in the fuel tank.

In the present embodiment, the system configuration in which the control system 200 includes the TCU 201, the ECU 202, the ECU 204, the ECU 205, the ECU 206, the MID 298, and the IVI 299 is illustrated, but the system configuration of the control system 200 is not limited to the example of the present embodiment. In addition, in the present embodiment, as an example, the moving body control unit that can be the target of the program update is the ECU 204, and the ECU 202 is described to function as an update control unit that controls the program update. It is noted that the moving body control unit that can be the target of the program update is not limited to the ECU 204. The moving body control unit that can be the target for the program update may be any of the TCU 201, the ECU 202, the ECU 204, the ECU 205, the ECU 206, the MID 298 and the IVI 299.

The ECU 202 includes a determination unit 210, an update control unit 220, a notification control unit 230, and an instruction obtainment control unit 240.

The update control unit 220 controls reception of the update program of the ECU 204 from an external device, and controls the update of the ECU 204 by the update program. The determination unit 210 determines whether the vehicle 20 is refueled during the time until the predetermined time elapses before the update of the ECU 204 is started by the update program. The update control unit 220 stops the start of the update of the ECU 204 by the update program when the determination unit 210 determines that the vehicle 20 is refueled.

The instruction obtainment control unit 240 controls obtainment of the user instruction to not execute the update of the ECU 204 by the update program until the predetermined time elapses. For example, the instruction obtainment control unit 240 executes control for obtaining the user instruction input to the IVI 299. The update control unit 220 starts the update of the ECU 204 by the update program when the user instruction is not obtained and the determination unit 210 determines that the vehicle 20 is not refueled.

The notification control unit 230 controls the notification to the user that relates to the update of the ECU 204. The user may be, for example, a passenger of the vehicle 20. The notification control unit 230 causes the MID 298 and the IVI 299 to display update notification information.

The instruction obtainment control unit 240 obtains the user instruction until the predetermined time elapses after the user is notified by the notification control unit 230. The update control unit 220 starts the update of the ECU 204 by the update program after the user is notified by the notification control unit 230 when the user instruction is not obtained until the predetermined time elapses and the determination unit 210 determines that the vehicle 20 is not refueled.

The predetermined time may be, for example, 30 seconds or more and 600 seconds or less. The predetermined time is preferably 300 seconds or less. The predetermined time is preferably 180 seconds or less. The shorter this time is, the more it is possible to prevent deterioration of the battery, since it is possible to reduce power consumption during the time until the user instruction is obtained. On the other hand, if this time is too short, it may be possible that the user's intention is not properly obtained when the user does not want to execute the update.

The notification to the user may include a notification for allowing the user to select whether to execute the update of the ECU 204. The update control unit 220 may start the update of the ECU 204 by the update program before the predetermined time elapses when the user instruction to execute the update of the ECU 204 is obtained by the instruction obtainment control unit 240. As a result, since the update can be started if the user instructs to execute the update, it is possible to reduce power consumption during user notification.

The determination unit 210 determines that the vehicle 20 is refueled when the storage amount of fuel in the vehicle 20 increases. The determination unit 210 calculates the storage amount of fuel based on a detection result of the fuel level sensor included in the fuel system sensor 297.

The determination unit 210 determines that the vehicle 20 is refueled when a refueling port of the vehicle 20 is opened. The determination unit 210 determines an open state of the refueling port based on an output of the fuel lid sensor included in the door system sensor 296.

The determination unit 210 determines that the vehicle 20 is refueled when the vehicle 20 exists in a refueling facility. The determination unit 210 determines whether the vehicle 20 exists in the refueling facility based on the location information obtained by the GNSS receiver 290 and location information of the refueling facility. The location information of the refueling facility may be stored in the IVI 299. The fuel is, for example, gasoline, diesel fuel, alcohol-based fuel, hydrogen fuel, and the like. The refueling facility is, for example, a gas station.

Figure 3:
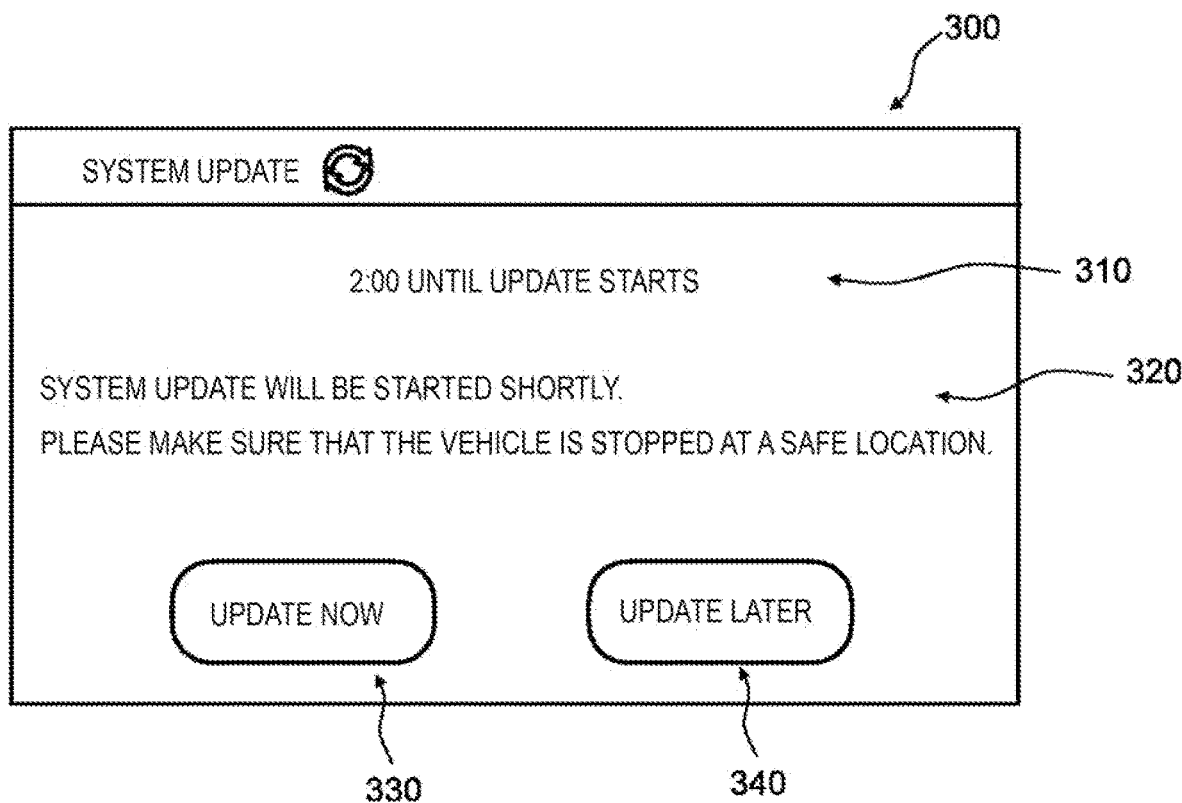
FIG. 3 shows an example of update notification information 300 displayed on an IVI 299.

FIG. 3 shows an example of update notification information 300 displayed on the WI 299. If the update of the ECU 204 by the update program downloaded from the external device 70 is possible, the notification control unit 230 displays the update notification information 300 on the WI 299 when the IG switch of the vehicle 20 is turned off.

The update notification information 300 includes wait time information 310 that is a time until the update of the ECU 204 starts, message information 320 to the user, a UI button 330 for obtaining an update execution instruction to execute the update from the user, and a UI button 340 for obtaining the update postponement instruction to not execute the update from the user.

The wait time information 310 includes information indicating a remaining time until the update control unit 220 automatically starts the update of the ECU 204. The notification control unit 230 counts down the remaining time of the wait time information 310 in response to the elapsing of time. The message information 320 is information for starting the update of the system and notifying the user that the vehicle 20 should be stopped at a safe place.

The instruction obtainment control unit 240 obtains that the location of the UI button 330 is operated as the update execution instruction from the user. The instruction obtainment control unit 240 obtains that the display location of the UI button 340 is operated as the update postponement instruction from the user.

Figure 4:
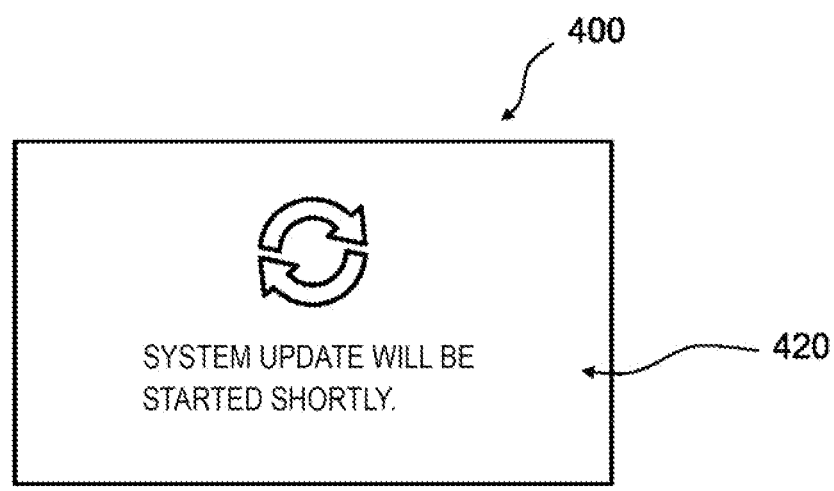
FIG. 4 shows an example of update notification information 400 displayed on an MID 298.

FIG. 4 shows an example of update notification information 400 displayed on the MID 298. The notification control unit 230 displays the update notification information 400 on the MID 298 when the update of the ECU 204 by the update program downloaded from the external device 70 is possible. The update notification information 400 includes message information 420 to the user. The message information 420 is information for notifying the user that the update of the system is starting.

In addition to the IVI 299, the notification control unit 230 notifies the user through the MID 298. As a result, it is possible for the user to be sure that the update will be started. For example, even if the IVI 299 is out of order, it is possible to notify the user through the MID 298.

It is noted that the notification control unit 230 may output a sound effect from the MID 298 when displaying the update notification information 300 and the update notification information 400. In addition, the notification control unit 230 may output wording of the message information 320 described in relation to FIG. 3 by voice. In this way, the notification control unit 230 may notify the user of the update by display and voice. Since the notification control unit 230 notifies by voice and display through the MID 298 and the IVI 299 respectively, even if one of the MID 298 and the IVI 299 is out of order, the user can be made aware of the update.

Figure 5:
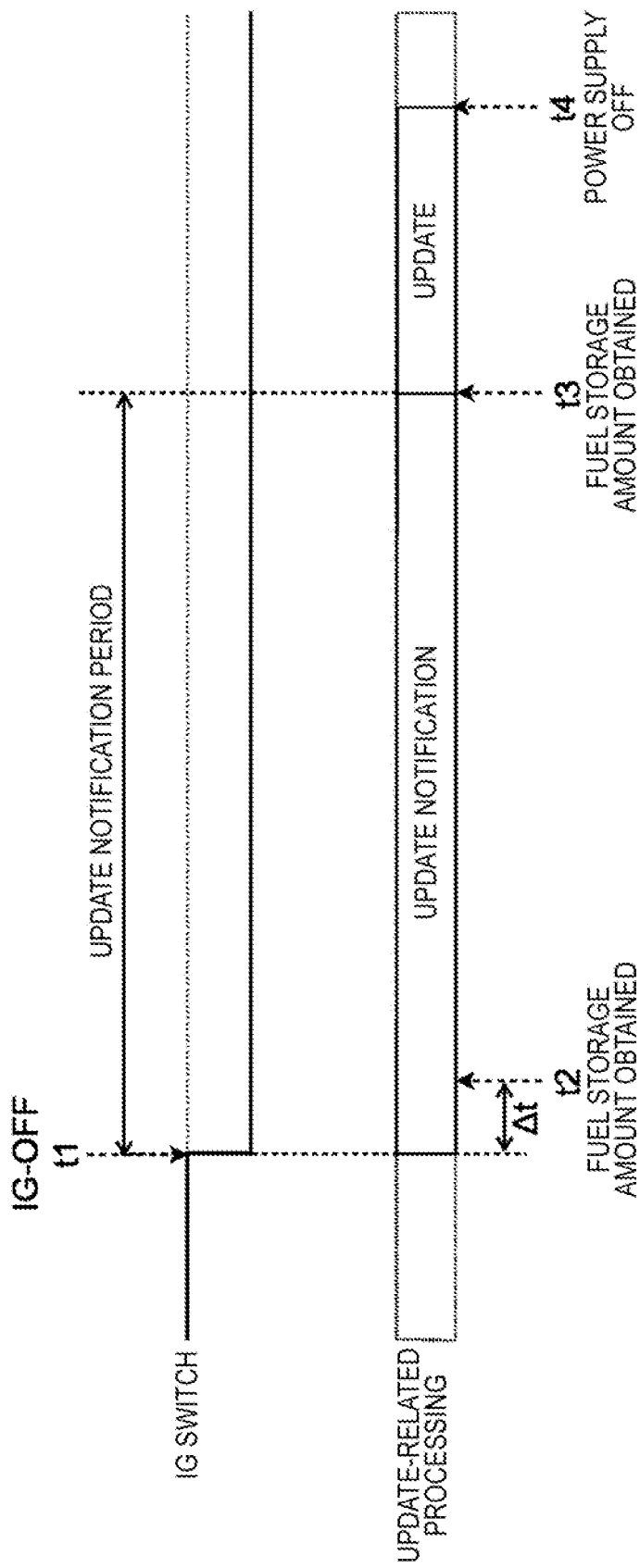
FIG. 5 schematically shows a time chart that relates to a program update process.

FIG. 5 schematically shows a time chart that relates to a program update process. FIG. 5 shows the state of the IG switch and an execution state of related processes that relates to the program update in the control system 200. The time chart in FIG. 5 is a time chart of when the ECU 204 is in a state where the update is possible.

At time t1, when the IG switch is turned off by the user, the update control unit 220 starts a countdown timer that expires at a predetermined time. The time for the countdown timer to expire is, for example, 120 seconds. In addition, when the IG switch is turned off, the notification control unit 230 notifies the user of the update. For example, the notification control unit 230 displays the update notification information 300 on the IVI 299 and displays the update notification information 400 on the MID 298.

At time t2, when a time Δt has elapsed since the IG switch was turned off, the determination unit 210 obtains the fuel storage amount based on an output by the fuel level sensor. At is set at 0 or a value longer than 0. By making Δt longer, it is possible to obtain the fuel storage amount when fluctuation of the fuel level inside the storage tank becomes small. At may be set according to a detection method of the fuel level sensor included in the vehicle 20.

When the countdown timer expires, the determination unit 210 newly obtains the fuel storage amount based on the output by the fuel level sensor at time t3. The determination unit 210 calculates an increase of the fuel storage amount from the difference between the fuel storage amount obtained at time t3 and the fuel storage amount obtained at time t2. The determination unit 210 starts the process of the program update of the ECU 204 when the increase of the fuel storage amount is smaller than a predetermined reference value. When the update process is complete, the power state of the vehicle 20 is turned off at time t4.

It is noted that when the increase of the fuel storage amount is the predetermined reference value or more, the update control unit 220 does not start the process of the program update of the ECU 204 and turns off the power state of the vehicle 20. As a result, it is possible to prevent the update of the ECU 204 from starting when the vehicle 20 is refueling at a fuel stand.

As a modification example of the time chart in FIG. 5, after the fuel storage amount is obtained at time t2, the fuel storage amount may be obtained at predetermined time intervals until an update notification period of 120 seconds elapses, and each time the fuel storage amount is obtained, the increase of the fuel storage amount from time t2 may be calculated. The determination unit 210 may determine whether the increase of the fuel storage amount is smaller than the predetermined reference value each time the fuel storage amount is obtained. When the increase of the fuel storage amount is the predetermined reference value or more, the update control unit 220 may determine to not start the update of the ECU 204 and turn off the power supply of the vehicle 20. As a result, it is possible to determine to not start the update of the ECU 204 before the update notification period of 120 seconds elapses.

It is noted that the determination unit 210 may obtain the increase of the fuel storage amount using fuel level information that is used for display of a fuel indicator displayed on the MID 298 and the like. In this case, the reference value of the increase of the fuel storage amount may be a fuel storage amount corresponding to one scale of the fuel indicator. For example, when a capacity of the fuel tank is 60 liters and the fuel indicator is displayed in 10 divisions, the reference value of the increase of the fuel storage amount may be set to 6 liters.

The time at which the countdown timer expires may be set according to a fuel supply amount per unit time at the fuel stand. The fuel supply amount per unit time at the fuel stand may be determined according to standard specifications of the fuel stand in the country or region where the vehicle 20 is used. The time at which the countdown timer expires may be set longer as the value obtained by dividing the reference value of the increase in the fuel storage amount by the fuel supply amount per unit time at the fuel stand is longer. In addition, since payment method and the like at the fuel stand differs depending on the country or region where the vehicle 20 is used, a time until refueling starts may differ depending on the country or region. For this reason, the time at which the countdown timer expires may be set for every country or region.

Here, the update process of the ECU 204 will be described. The update process when a memory for storing firmware of the ECU 204 is a single bank memory (so-called one-sided ROM) will be described. In this case, since the ECU 204 has one program storage area for storing the firmware, if the ECU 204 is operating according to the program stored in the program storage area, the update program cannot be written to the program storage area. When performing the update of the ECU 204, the update control unit 220 instructs for the update to the ECU 204 after forwarding the update program to a predetermined storage area of the ECU 204. When the update is instructed, the ECU 204 executes a control code for performing the program update, writes the update program that has been forwarded to the predetermined storage area to the program storage area, and activates the update program. The activation of the update program includes a process of setting an activation parameter of the ECU 204 so that, for example, the update program is loaded and control based on the update program is started when the ECU 204 is activated. It is noted that when the memory for storing firmware of the ECU 204 is the single bank memory, "a state in which update of the ECU 204 is possible" may be a state in which the update program has been forwarded to the predetermined storage area of the ECU 204.

Next, the update process when the memory for storing the firmware of the ECU 204 is a double bank memory (so-called two-sided ROM) will be described. In this case, since the ECU 204 has two program storage areas for storing the firmware, when the ECU 204 is operating according to a program stored in a first program storage area, the update program can be written to a second program storage area. For example, even when the vehicle 20 is running, the update program can be written to the second program storage area. For this reason, when the update control unit 220 forwards the update program to the ECU 204, it instructs for the update program to be written in the second program storage area. When writing of the update program to the second program storage area is complete, it becomes possible to update the ECU 204. When the update control unit 220 performs the update of the ECU 204, the update control unit 220 instructs the ECU 204 to activate the update program written to the second program storage area. The activation of the update program includes a process of setting an activation parameter of the ECU 204 so that, for example, the update program stored to the second program storage area is loaded and control based on the update program is started when the ECU 204 is activated. For example, activation of the update program includes a process of validating the second program storage area as a read-out area of the program and invalidating the first program storage area as the read-out area of the program. In this way, "updating the ECU by the update program" is a concept including writing the update program to the program storage area of the ECU. In addition, "updating the ECU by the update program" is a concept including activating the update program written to the program storage area.

Figure 6:
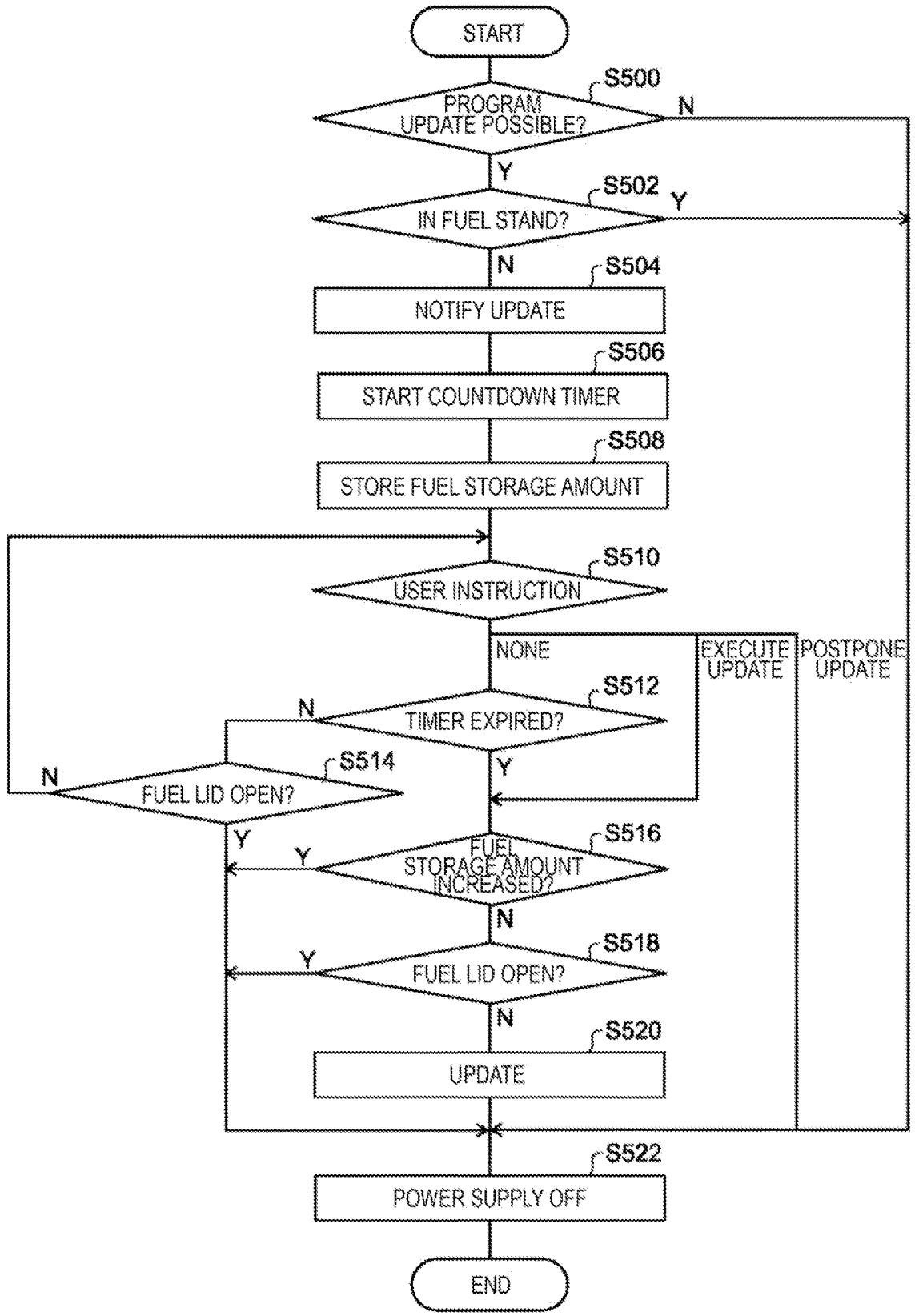
FIG. 6 is a flowchart showing an example of an execution procedure of a process that relates to an update of an ECU 204.

FIG. 6 is a flowchart showing an example of an execution procedure of the process that relates to the update of the ECU 204. The process of the flowchart of FIG. 6 is started when the IG switch is turned off.

In S500, the update control unit 220 determines whether the program update of the ECU 204 is possible. When the program update of the ECU 204 is not possible, in S522, the power state of the vehicle 20 is turned off, and the process of this flowchart is ended. When the program update of the ECU 204 is possible, the process moves to S502.

In S502, the determination unit 210 determines whether the current location of the vehicle 20 is inside of a fuel stand. The determination unit 210 determines whether the current location of the vehicle 20 is inside of a fuel stand based on the location information obtained by the GNSS receiver 290 and the location information of fuel stands registered to the IVI 299. For example, the determination unit 210 determines that the current location of the vehicle 20 is inside of a fuel stand when there exists a fuel stand that is located from the current location of the vehicle 20 at a distance that is shorter than a predetermined distance among the fuel stands registered to the IVI 299. When the current location of the vehicle 20 is inside of a fuel stand, the process moves to S522, and when the current location of the vehicle 20 is not inside of a fuel stand, the process moves to S504.

In S504, the notification control unit 230 notifies the user of the program update. For example, the notification control unit 230 displays the update notification information 300 on the IVI 299 and displays the update notification information 400 on the MID 298. In S506, the update control unit 220 starts the countdown timer. As an example, the countdown timer is a timer that expires in 120 seconds. In S508, the determination unit 210 obtains the fuel storage amount in the fuel tank in the vehicle 20 based on the output of the fuel level sensor and stores it.

In S510, the instruction obtainment control unit 240 determines the user instruction. For example, the instruction obtainment control unit 240 determines that there is no user instruction when user operation information from the IVI 299 is not obtained. The instruction obtainment control unit 240 determines that the user instruction is the update execution instruction when user operation information indicating that the location of the UI button 330 of FIG. 3 has been operated is obtained from the IVI 299. The instruction obtainment control unit 240 determines that the user instruction is the update postponement instruction when user operation information indicating that the location of the UI button 340 of FIG. 3 has been operated is obtained from the IVI 299.

When it is determined that the user instruction is the update postponement instruction in S510, the process moves to S522. When it is determined that the user instruction is the update execution instruction in S510, the process moves to S516. When it is determined that there was no user instruction in S510, the process moves to S512.

In S512, the update control unit 220 determines whether the countdown timer has expired. When the countdown timer has expired, the process moves to S516. When the countdown timer has not expired, the process moves to S514. In S514, the determination unit 210 determines whether the fuel lid is open. When the fuel lid is not open, the process moves to S510. When the fuel lid is open, the process moves to S522.

When the countdown timer has expired, in S516, the determination unit 210 determines whether the fuel storage amount in the fuel tank has increased. For example, the determination unit 210 newly obtains the fuel storage amount in the fuel tank of the vehicle 20 based on the output of the fuel level sensor, and calculates the increase of the fuel storage amount from the difference between the newly obtained fuel storage amount and the fuel storage amount that was stored in S508. The determination unit 210 determines that the fuel storage amount in the fuel tank has increased when the increase of the fuel storage amount is more than the predetermined value, and determines that the fuel storage amount in the fuel tank has not increased when the increase of the fuel storage amount is the predetermined value or less. When the fuel storage amount in the fuel tank has increased, the process moves to S522, and when the fuel storage amount in the fuel tank has not increased, the process moves to S518.

In S518, the determination unit 210 determines whether the fuel lid is open. When the fuel lid is not open, the process moves to S520. When the fuel lid is open, the process moves to S522. In S520, the update control unit 220 executes the update of the ECU 204 by the update program. When the update of the ECU 204 is complete, the process moves to S522.

It is noted that FIG. 6 is a flowchart of when Δt described in the time chart of FIG. 5 is set to 0. When Δt is set to a value longer than 0, the process of S508 should be performed when the time Δt has elapsed from when the countdown timer was started.

As described above, according to the control by the control system 200 according to the present embodiment, it is possible to prevent the update of the ECU from being started when fuel is supplied to the vehicle 20. As a result, it is possible to prevent the update from the ECU from being started when the vehicle 20 is temporarily stopped at a fuel stand and causing occurrence of downtime of the vehicle 20. For example, at a self-service fuel stand where the user refuels the vehicle 20 himself/herself, since the user disembarks and refuels, the user may fail to confirm the update notification that is displayed after the IG is turned off. Even in such a case, since the update of the ECU is not started when it is detected that the vehicle 20 is refueled with fuel, it is possible to reduce the possibility of occurrence of downtime that is unintended by the user. In addition, since it is determined whether to start the update of the ECU from the increase of the storage amount of fuel, it is possible to appropriately determine whether to start the update of the ECU even if the vehicle is not installed with the fuel lid sensor.

It is noted that the vehicle 20 may be an automobile including an internal combustion engine. The vehicle 20 may be a fuel cell vehicle (FCV) and the like. The vehicle 20 is an example of a moving body. The moving body includes automobiles such as passenger cars, buses, and the like, saddle-type vehicles, aircrafts, and transportation devices such as ships and the like. The transportation device may be any device that transports a person or goods. The moving body is not limited to a transport device, and may be any movable device.

Figure 7:
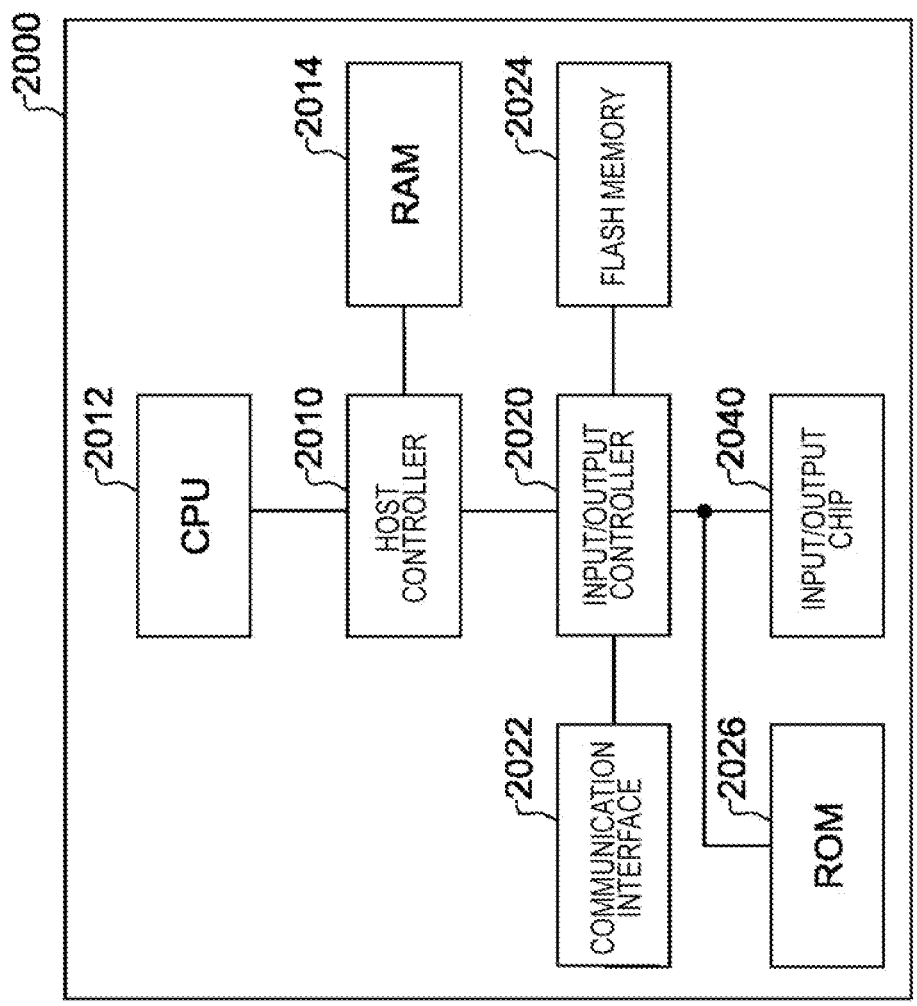
FIG. 7 shows an example of a computer 2000.

FIG. 7 shows an example of a computer 2000 in which multiple embodiments of the present invention can be embodied in whole or in part. A program installed in the computer 2000 can cause the computer 2000 to execute an operation associated with a device or parts of a device, to function as a system such as the control system and the like according to the embodiment, said device, or parts of said device, and/or to execute a process according to the embodiment or steps of said process. Such a program may be executed by the CPU 2012 to cause the computer 2000 to execute certain operations associated with some or all of the process procedures and blocks of the block diagram according to the present description.

The computer 2000 according to the present embodiment includes the CPU 2012 and the RAM 2014, and these are connected to each other by the host controller 2010. In addition, the computer 2000 includes a ROM 2026, a flash memory 2024, a communication interface 2022, and an input/output chip 2040. The ROM 2026, the flash memory 2024, the communication interface 2022, and the input/output chip 2040 are connected to the host controller 2010 via the input/output controller 2020.

The CPU 2012 operates according to the program stored in the ROM 2026 and the RAM 2014, thereby controlling each unit.

The communication interface 2022 communicates with other electronic devices via a network. The flash memory 2024 stores the program and data used by the CPU 2012 in the computer 2000. The ROM 2026 stores a boot program and the like executed by the computer 2000 at the time of activation and/or a program depending on hardware of the computer 2000. In addition, the input/output chip 2040 may connect various input/output units such as a keyboard, a mouse, a monitor, and the like to the input/output controller 2020 via an input/output port such as a serial port, a parallel port, a keyboard port, a mouse port, a monitor port, a USB port, an HDMI (registered trademark) port, and the like.

The program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014, or the ROM 2026, and executed by the CPU 2012. Information processing described in these programs is read by the computer 2000, and provides a link between the program and the various types of hardware resources described above. The device or method may be configured to implement the operation or processing of information according to the use of the computer 2000.

For example, when communication is executed between the computer 2000 and an external device, the CPU 2012 may execute a communication program loaded to the RAM 2014, and instruct for communication processing to the communication interface 2022 based on the processing described in the communication program. Under control by the CPU 2012, the communication interface 2022 reads transmission data stored in a transmission buffer processing area provided in a recording medium such as the RAM 2014 and the flash memory 2024, sends the read transmission data to the network, and writes received data received from the network to a reception buffer processing area and the like provided in the recording medium.

In addition, the CPU 2012 may make all or necessary parts of a file or a database stored in a recording medium such as the flash memory 2024 and the like to be readable by the RAM 2014, and execute various processing on the data in the RAM 2014. Next, the CPU 2012 writes back the processed data to the recording medium.

Various types of information such as various types of programs, data, tables, and databases may be stored in the recording medium and be subject to information processing. The CPU 2012 may execute various types of processing described in the present description including various types of operations, information processing, conditional determination, conditional branching, unconditional branching, information retrieval/replacement, and the like specified by an instruction sequence of a program on the data read from the RAM 2014, and write back the results to the RAM 2014. In addition, the CPU 2012 may search for information in the files, databases, and the like in the recording medium. For example, when a plurality of entries each having an attribute value of a first attribute associated with the attribute value of a second attribute are stored in the recording medium, the CPU 2012 may search for an entry among said plurality of entries that matches a condition specified by the attribute value of the first attribute, read the attribute value of the second attribute stored in said entry, and thereby obtain the attribute value of the second attribute associated with the first attribute satisfying a predetermined condition.

The programs or software modules described above may be stored in a computer-readable storage medium on the computer 2000 or near the computer 2000. A recording medium such as a hard disk or RAM provided in a server system connected to a dedicated communication network or the Internet can be used as the computer-readable storage medium. The programs stored in the computer-readable storage medium may be provided to the computer 2000 via a network.

The programs installed in the computer 2000 that cause the computer 2000 to function as the control system 200 may act on the CPU 2012 and the like and cause the computer 2000 to function as each of the units of the control system 200. When the information processing described in these programs is read to the computer 2000, it functions as each unit of the control system 200 that is a concrete means in which the software and various hardware resources described above cooperate with each other. Then, by realizing the calculations or processing of information according to the purpose of use of the computer 2000 in the present embodiment by these specific means, a unique control system 200 according to the purpose of use is constructed.

Various embodiments were explained with reference to a block diagram and the like. In the block diagram, each block may represent (1) a step of a process in which an operation is performed or (2) each unit of a device responsible for performing an operation. Specific steps and units may be implemented by a dedicated circuit, a programmable circuit supplied with computer-readable instructions stored on a computer-readable storage medium, and/or a processor supplied with computer-readable instructions stored on a computer-readable storage medium. The dedicated circuit may include a digital and/or analog hardware circuit, and may include an integrated circuit (IC) and/or a discrete circuit. The programmable circuit may include a reconfigurable hardware circuit including memory elements and the like including logical AND, logical OR, logical XOR, logical NAND, logical NOR, and other logic operations, flip-flops, registers, field programmable gate arrays (FPGAs), programmable logic arrays (PLAs), and the like.

The computer-readable storage medium may include any tangible device capable of storing instructions executed by an appropriate device, so that the computer-readable storage medium having the instructions stored therein configures at least a part of devices that include instructions that may be executed to provide means to perform an operation specified by the processing procedure or the block diagram. Examples of the computer-readable storage medium may include an electronic storage medium, a magnetic storage medium, an optical storage medium, an electromagnetic storage medium, a semiconductor storage medium, and the like. More specific examples of the computer-readable storage medium includes a floppy (registered trademark) disk, a diskette, a hard disk, a Random Access Memory (RAM), a Read Only Memory (ROM), an Erasable Programmable Read Only Memory (EPROM or flash memory), an Electrically Erasable Programmable Read Only Memory (EEPROM), a Static Random Access Memory (SRAM), a Compact Disc Read Only Memory (CD-ROM), a Digital Versatile Disc (DVD), a Blu-ray® Disc, a memory stick, an integrated circuit card, and the like.

The computer-readable instructions may include assembler instructions, Instruction Set Architecture (ISA) instructions, machine instructions, machine-dependent instructions, micro-codes, firmware instructions, state setting data, or any of a source code or object code written in any combination of one or more programming languages including object oriented programming language such as Smalltalk (registered trademark), JAVA (registered trademark), C++, and the like, and traditional procedural programming languages such as the "C" programming language or similar programming languages.

The computer-readable instructions may be provided to a general purpose computer, a special purpose computer, or a processor or programmable circuit of another programmable data processing device locally, via a local area network (LAN), or via a wide area network (WAN) such as the Internet and the like, and execute the computer-readable instructions to provide a means for executing the operations specified in the described processing procedures or block diagram. Examples of processors include computer processors, processing units, microprocessors, digital signal processors, controllers, microcontrollers, and the like.

While the embodiments of the present invention have been described, the technical scope of the invention is not limited to the scope according to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

It should be considered that the operations, procedures, steps, stages, and the like of each process executed by a device, system, program, and method shown in the scope of the claims, embodiments, or diagrams can be executed in any order as long as the order is not indicated by "prior to," "before," and the like and as long as the output from a previous process is not used in a later process. Even if the process flow is described using phrases such as "first", "next", and the like in the scope of the claims, embodiments, or diagrams, it does not necessarily mean that the process must be executed in this order.

EXPLANATION OF REFERENCES 10 update system
20 vehicle
70 external device
90 communication network
200 control system
201 TCU
202 ECU
204 ECU
205 ECU
206 ECU
210 determination unit
220 update control unit
230 notification control unit
240 instruction obtainment control unit
280 in-vehicle communication line
290 GNSS receiver
294 FI
295 battery
296 door system sensor
297 fuel system sensor
298 MID
299 IVI
300 update notification information
310 wait time information
320 message information 330 UI button
340 UI button
400 update notification information
420 message information
2000 computer
2010 host controller
2012 CPU
2014 RAM
2020 input/output controller
2022 communication interface
2024 flash memory
2026 ROM
2040 input/output chip

What is claimed is:

1. A control system comprising:
an ECU (Electronic Control Unit) that controls a moving body; and
a processor configured to control reception of an update program of the ECU from an external device, and to control update of the ECU by the update program; wherein
the processor is further configured to
determine whether the moving body is refueled during a time until a predetermined time elapses before the update of the ECU by the update program is started,
stop starting of the update of the ECU by the update program when it is determined that the moving body is refueled,
control obtainment of a user instruction to not execute the update of the ECU by the update program during the time until the predetermined time elapses, and
start the update of the ECU by the update program when the user instruction is not obtained and it is determined that the moving body is not refueled.

2. The control system according to claim 1, wherein the processor is further configured to
control notification to a user that relates to the update of the ECU, wherein
after the notification has been executed to the user, the processor is further configured to obtain the user instruction during the time until the predetermined time elapses, and
after the notification has been executed to the user, the processor is further configured to start the update of the ECU by the update program when the user instruction is not obtained during the time until the predetermined time elapses and it is determined that the moving body is not refueled.

3. The control system according to claim 2, wherein the predetermined time is 30 seconds or more and 600 seconds or less.

4. The control system according to claim 3, wherein the predetermined time is 300 seconds or less.

5. The control system according to claim 2, wherein the notification to the user includes a notification for making a user select whether to execute the update of the ECU, and
the processor is further configured to start the update of the ECU by the update program before the predetermined time elapses when a user instruction to execute the update of the ECU is obtained.

6. The control system according to claim 1, wherein the processor is further configured to determine that the moving body is refueled when a storage amount of fuel in the moving body increases.

7. The control system according to claim 1, wherein the processor is further configured to determine that the moving body is refueled when a refueling port of the moving body is opened.

8. The control system according to claim 1, wherein the processor is further configured to determine that the moving body is refueled when the moving body exists in a refueling facility.

9. The control system according to claim 3, wherein the notification to the user includes a notification for making a user select whether to execute the update of the ECU, and
the processor is further configured to start the update of the ECU by the update program before the predetermined time elapses when a user instruction to execute the update of the ECU is obtained.

10. The control system according to claim 2, wherein the processor is further configured to determine that the moving body is refueled when a storage amount of fuel in the moving body increases.

11. The control system according to claim 2, wherein the processor is further configured to determine that the moving body is refueled when a refueling port of the moving body is opened.

12. The control system according to claim 2, wherein the processor is further configured to determine that the moving body is refueled when the moving body exists in a refueling facility.

13. A moving body comprising:
the control system according to claim 1.

14. The moving body according to claim 13, wherein the moving body is a vehicle.

15. A control method comprising:
receiving an update program of a moving body controller control unit configured to control a moving body from an external device;
determining whether the moving body is refueled during a time until a predetermined time elapses before an update of the moving body control unit by the update program is started;
stopping starting of the update of the moving body control unit by the update program when it is determined that the moving body is refueled,
controlling obtainment of a user instruction to not execute the update of the moving body controller by the update program during the time until the predetermined time elapses; and
starting the update of the moving body controller by the update program when the user instruction is not obtained and it is determined that the moving body is not refueled.

16. A non-temporary computer-readable storage medium having stored thereon a program that causes a computer to function as:
a moving body control unit configured to control a moving body;
an update control unit configured to control reception of an update program of the moving body control unit from an external device and controlling update of the moving body control unit by the update program;
a determination unit configured to determine whether the moving body is refueled during a time until a predetermined time elapses before the update of the moving body control unit by the update program is started; and
an instruction obtainment control unit configured to control obtainment of a user instruction to not execute the update of the moving body control unit by the update program during the time until the predetermined time elapses, wherein by the program, the update control unit is configured to stop the start of the update of the moving body control unit by the update program when the determination unit determines that the moving body is refueled, and the update control unit is configured to start the update of the moving body control unit by the update program when the user instruction is not obtained and the determination unit determines that the moving body is not refueled.

* * * * *